United States Patent [19]
Spaggiari

[11] Patent Number: 6,065,522
[45] Date of Patent: May 23, 2000

[54] DEVICE FOR CONSTRAINING A WHEEL AND TYPE ASSEMBLY ON A PLATFORM

[75] Inventor: Rino Spaggiari, Correggio, Italy

[73] Assignee: G.S. S.r.l., Correggio, Italy

[21] Appl. No.: 09/064,313

[22] Filed: Apr. 23, 1998

[30] Foreign Application Priority Data

Jul. 18, 1997 [IT] Italy .................................. MO97A0135

[51] Int. Cl.[7] .................................................. B60C 25/00
[52] U.S. Cl. .............................................. 157/1.1; 157/21
[58] Field of Search ................................ 157/1, 1.1, 14, 157/19, 21, 1.17, 1.2, 1.22, 1.24, 1.26, 1.28

[56] References Cited

FOREIGN PATENT DOCUMENTS

| | | |
|---|---|---|
| 0767098 | 4/1997 | European Pat. Off. . |
| 0805053 | 11/1997 | European Pat. Off. . |
| 3016193 | 11/1980 | Germany . |

*Primary Examiner*—D. S. Meislin
*Attorney, Agent, or Firm*—Browdy and Neimark

[57] ABSTRACT

A tire changing machine having a self-centering platform with a vertical axis is provided with a safety device for releasably locking on the platform a wheel with a tire. The device is particularly useful during tire-inflating operations to prevent an operator from suffering injury due to an explosion of the tire. The device comprises a stem which is vertically slidable with respect to a horizontal arm, the stem inferiorly bearing a plate interacting contactingly with the wheel placed on the platform. A retaining organ exhibits a hole in which a vertical rod which is solidly constrained to the arm is inserted with a predetermined degree of play. The retaining organ is hinged to the stem in such a way as to be able to assume at least one locked position in which it prevents the stem from rising.

8 Claims, 1 Drawing Sheet

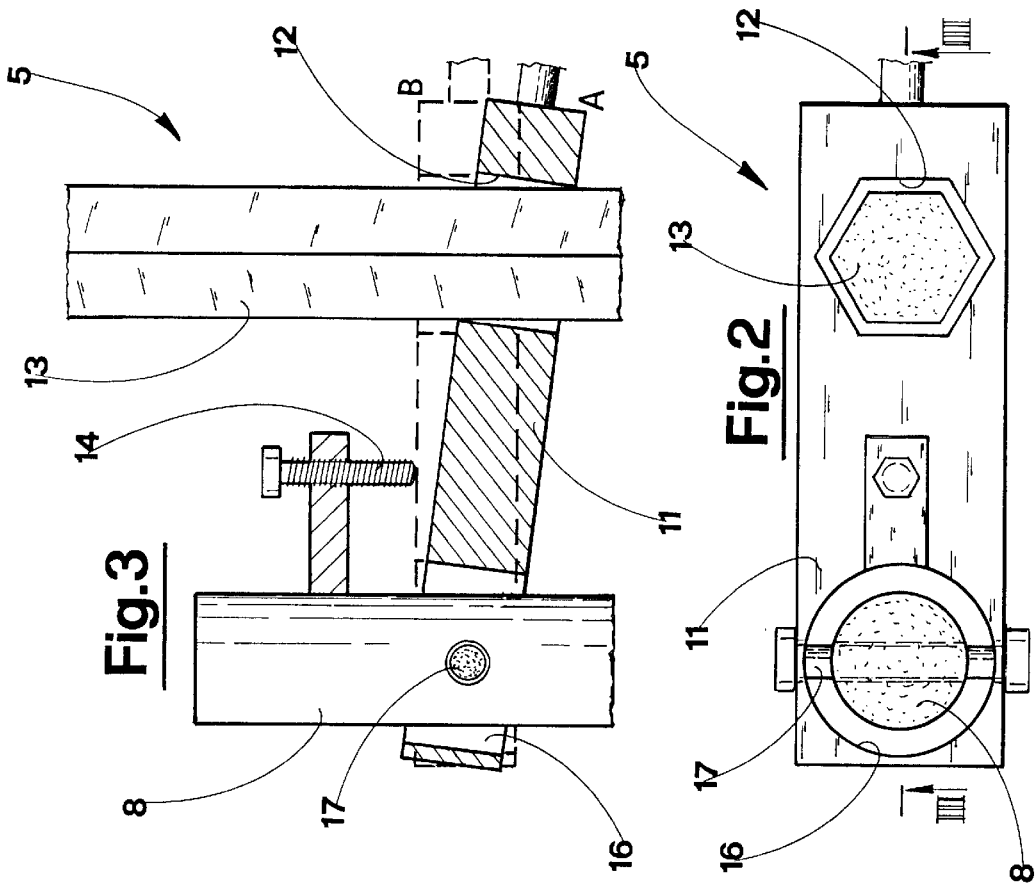
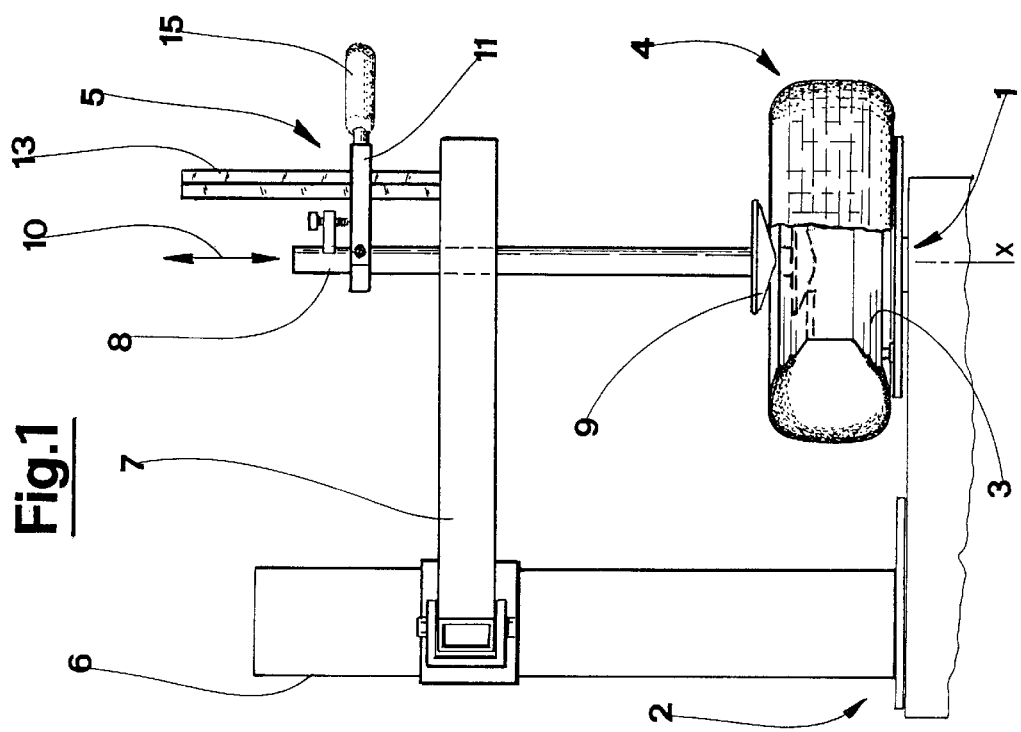

DEVICE FOR CONSTRAINING A WHEEL AND TYPE ASSEMBLY ON A PLATFORM

BACKGROUND OF THE INVENTION.

1. Technical Background of the Invention

The invention relates to a device for constraining a wheel and tire assembly on a platform.

Specifically, though not exclusively, the device can be applied on machines for mounting and dismounting tires on wheels which machines have a self-centered platform, which is equipped with means for gripping and centering the wheel and which is rotatable about a normally vertical axis.

2. Prior Art

In tire changing machines there is always the prime need to protect the operator against any tire explosion during the inflating operation, which is usually done with the tire mounted on the platform. Without appropriate safety systems keeping the wheel in its position on the platform any explosion would have disastrous effects. The wheel would be projected violently away from the platform, causing great risk to the operator and to anyone else who found themselves in the vicinity of the machine.

Known safety systems comprise a horizontal arm, situated above the platform and rotatable on command about a vertical rotation axis, to which it is slidably coupled, with a vertical axis, a stem bearing at an extremity thereof a plate that can be positioned in contact with a wheel placed (centered and blocked) on the platform. Before inflating the tire, the operator secures the wheel to the platform by positioning the rotatable arm on the platform and setting the plate above the central part of the wheel rim, thus exploiting the arm's ability to slide vertically. Then, using a locking device generally cam-activated, he constrains the stem to the arm so that the wheel is solidly anchored on the platform so as to be constrained thereon even when subjected to very violent solicitation, as in the case of an explosion.

In known devices, usually the stem is immobilized to the arm by means of a manually-actuable clamp mounted on the arm and comprising a rotatable cam-type control lever. This clamp, however is not secure and reliable enough, especially as the cam is subject to wear which might, after many anchoring and unblocking operations lead to a deterioration in blocking effectiveness.

SUMMARY OF THE INVENTION

The main aim of the present invention is to obviate the above-mentioned drawback in the known art by providing an extremely safe and efficient device which remains so even after many work cycles.

An advantage of the invention is that it provides a device which is extremely simple and rapid to use, requiring only a minimum effort on the part of the operator.

A further advantage is that it is structurally and functionally configured so as not to require any direct action (for example, clamping) on the part of the operator in order to block the stem in any safety position.

Other advantages offered by the present invention are the low costs involved in its construction, which makes use of simple mechanisms, and its functional reliability.

BRIEF DESCRIPTION OF THE DRAWINGS

Further characteristics and advantages of the present invention will better emerge from the detailed description that follows of a preferred but non-exclusive embodiment of the invention illustrated purely by way of a non-limiting example in the accompanying figures of the drawings, in which:

FIG. 1 shows a schematic lateral vertical elevation of the device applied to a tire changing machine;

FIG. 2 shows a schematic plan view from above the device;

FIG. 3 shows a section made according to line III—III of FIG. 2, with the retaining organ represented in two different operative configurations.

DETAILED DESCRIPTION OF THE PREFERRED EMBODIMENTS.

With reference to the above-mentioned figures of the drawings 1 denotes in its entirety a self-centering platform, with a vertical rotation axis x, applied on a frame of a tire changing machine 2 of known type. The self-centering platform 1 is equipped with the usual fasteners for constraining vehicle wheel rims thereto. The tired rim 3 of a motor vehicle wheel 4 can be positioned centered and constrained on the platform.

A safety device 5 is associated to the platform 1 for constraining a wheel 4 placed thereon. The safety device 5 serves especially to prevent the wheel 4 from being unleashed violently away from the platform 1 following an explosion of the tire during inflation thereof.

The safety device 5 comprises an upright 6, vertically extending above the level of the self-centering platform 1, which might for example be one of the uprights normally present in the frame of the tire-changing machine. A horizontal arm 7 is constrained to the upright 6, which arm 7 can perform a rotating movement about a vertical axis which is parallel and close to the axis of the upright 6, so that the arm 7 can be positioned along a horizontal plane situated above the self-centering platform 1. The arm 7 is constained to the upright 6 with a rotatable connection 19.

A cylindrical stem 8 with a vertical sliding axis is slidably coupled to the arm 7. The arm 7 can assume a position in which the stem 8 is coaxial or nearly so with the rotation axis x of platform 1. The lower end of the stem 8 exhibits a plate 9, usually circular but which could be any shape, destined to interact contactingly with the central part of the wheel rim 3 located on the platform 1. In the illustrated example the lower surface of the plate 9 exhibits a downwards-directed convexity; concave or flat plates could be used instead, however.

The stem 8 can slide vertically in both directions with respect to the arm 7 (as indicated by arrows 10) and can be made fixed in request to the arm 7 itself only in a case where the plate 9, placed at the lower end of the stem 8 and interacting contactingly with the wheel 4, is for any reason solicited to move upwards. When such a situation arises the stem 8 is made automatically fixed in request to the arm 7 and the device 5 can prevent the wheel 4 from lifting from the platform 1, a situation which would in fact arise should a tire explode.

The stem 8 is freely slidable with respect to the arm 7 in a downwards direction.

The means for immobilizing the stem 8 with respect to the arm 7 comprise a plate-shaped retaining lever 11, having a first hole 12 which, in the example illustrated is hexagonal, in which hole 12 a rod 13 solidly fixed to the arm 7 is inserted with a predetermined degree of play. The rod 13, which also exhibits a hexagonal straight section, extends in a parallel direction to the sliding axis of the stem 8, which in the illustrated example is vertical.

The retaining lever 11 exhibits a first end which is engaged to the stem 8 and able to assume a first and lower locking position A (indicated by an unbroken line in FIG. 3) in which it prevents the stem 8 from sliding upwards due to the contact between the rod 13 and the surface of the retaining lever 11 which surrounds the first hole 12. This position A is the characteristic locking position of a locking mechanism of the type achieved by what is commonly called the retaining lever. The retaining lever 11 is brought into locking position A thanks to its own weight.

The retaining lever 11 can further assume, if lifted, at least one other position, an unlocking position or upper position B (shown in a broken line in FIG. 3) in which a free axial sliding of the stem 8 is allowed i.e. sliding of the stem in an upwards direction.

A striker element 14, adjustably engaged to the stem 8, is predisposed to limit the upward rotation of the retaining lever 11 with respect to the stem 8. The striker element 14 serves in substance to prevent the retaining lever 11 from being tilted upwards to reach a locking position on the vertical rod 13 by a raising of the retaining lever 11 itself. The striker element 14, which in the illustrated case is constituted by a screw, is conformed and arranged so as to stop the retaining lever 11 at position B, i.e. the unlocked position. The position of the striker element 14 can be adjusted by a simple screwing or unscrewing operation. In another embodiment, not illustrated, two striker elements could be provided, operatively associated with the retaining lever 11 and able to stop it in unlocked position B (horizontal or more or less so), which striker elements could be set side-by-side and spaced one from the other, and preferably arranged on opposite sides with respect to the vertical plane constituted by the axes of the stem 8 and the rod 13.

The retaining lever 11 exhibits a second end, opposite to the first, which is associable to external movement means with which the retaining lever 11 can be raised into the unlocking position B. In the illustrated case the retaining lever 11 is moved manually, the second end thereof exhibiting a grip 15. The retaining lever 11 exhibits a second hole 16, circular in shape, in which the stem 8 is inserted with ample play. In the embodiment illustrated, the retaining lever 11 is hinged to the stem 8 about a pivot 17, which is situated inside the second hole 16 and which is provided with a horizontal axis which is incident or nearly so with the axis of the stem 8. The retaining lever 11 might exhibit, in place of the second hole 16, a fork-shaped end. The retaining lever could be constrained to the stem 8 by means of different-type connections to the one illustrated in the accompanying figures, such as for example connections presently used for retaining lever mechanisms commonly in use.

The safety device 5 is provided with an angular position sensor, of known type, for reading the angular position of the horizontal rotating arm 7, and which sends a consent signal to the tire inflating means only when the stem 8 is substantially coaxial with the rotation axis x of the platform 1. The above-mentioned sensor has the task of guaranteeing that the inflation operation is carried out only when the safety device 5 has effectively locked the wheel 4 in position.

As mentioned above, the safety device 5 is useful when a tire of a wheel 4 placed on the platform 1 is to be inflated, otherwise the rotating arm 7 of the device 5 is normally positioned away from the platform 1 of the tire-changing machine 2, so as not to get in the way during other operations which have be performed on the wheel.

The safety device 5 is now described. Before inflating the tire, the operator grips the second end of the retaining lever 11 pulling it upwards so as to bring the lever 11 into unlocked position B in which the stem 8 can be slid upwards. Then the operator rotates the arm 7 of the device 5, with the stem 8 raised, up until the stem 8 itself and the plate 9 are positioned above the central zone of the rim 3 of the wheel to be inflated. Then the operator lets go of the grip 15 and the retaining lever 11 falls into position A by virtue of its own weight. In this configuration, any upward solicitation on the stem 8, due for example to an explosion of the tire, would be contrasted by the vertical rod 13 on the arm 7, which rod 13 prevents clockwise movements (see FIG. 3) of the retaining lever 11. The safety device 5 in substance functions as a mechanism commonly known as a retaining lever. The unlocking of the device 5 is simply achieved by gripping the retaining lever 11 by the grip 15 and lifting it into unlocked position B.

What is claimed:

1. A device for constraining a wheel and tire assembly on a self-centering platform of a tire changing machine, said device comprising:

an upright adapted to be engaged on said tire changing machine to extend vertically above the platform;

an arm having a first end rotatably engaged to the upright to permit a rotation movement in a horizontal plane above the platform;

a rod fixed at a second end of the arm and having a longitudinal axis parallel to a longitudinal axis of said upright;

a retaining lever having a first end with a first hole in which said rod is inserted with a predetermined degree of play;

a stem having a longitudinal length inserted to move vertically freely in a hole in the arm;

said retaining lever having a second end opposite to said first end rotatably engaged to said stem;

said arm being rotatable on said upright in said horizontal plane to a position in which an axis of the stem is adapted to be moved to be coaxial with a rotation axis of the platform; and means on said first end of said retaining lever to rotate said retaining lever to wherein said rod is disengaged from said first hole and a lower end of the stem is adapted to move downward to engage the wheel when the axis of the stem and the axis of rotation of the platform are coaxial;

wherein said rod is normally engaged to said first hole by a weight of the retaining lever, and said retaining lever is in a locked position in which said stem is prevented from sliding upward in said arm, wherein in said locked position said lower end of the stem is adapted to interact with the wheel to prevent the wheel from lifting off the platform.

2. The device of claim 1, comprising at least one striker element engaged to the stem to limit upward rotation of the retaining lever with respect to the stem in the unlocked position.

3. The device of claim 2, wherein a position of the striker element can be adjusted in relation to the stem and the retaining lever.

4. The device of claim 1, in combination with a self-centering platform having a vertical rotation axis on a tire changing machine.

5. The device of claim 1, wherein the retaining lever is hinged to the stem and rotates around a horizontal axis.

6. The device of claim 5, wherein a rotation axis of the retaining lever in coincident to the axis of the stem.

7. The device of claim 1, wherein the means on said first end of said retaining lever is a grip which can be manually raised.

8. The device of claim 1, wherein the stem is freely movable with respect to the arm during downward directed movement.

* * * * *